Figure 12:
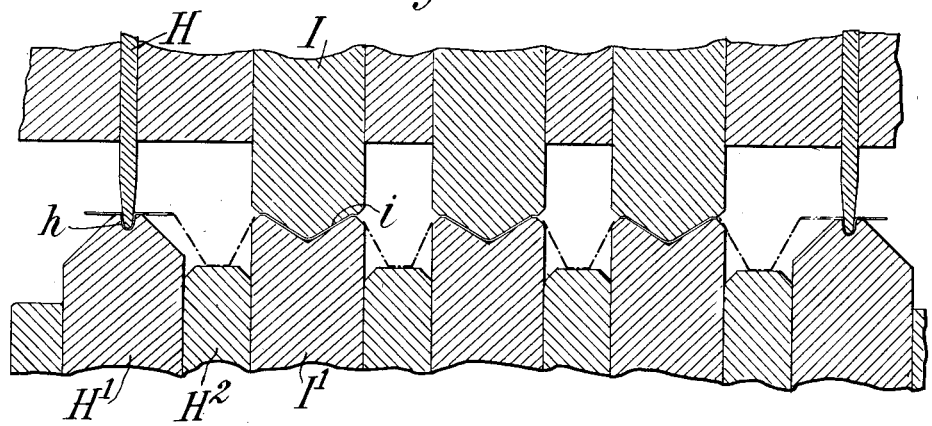
Figure 13:
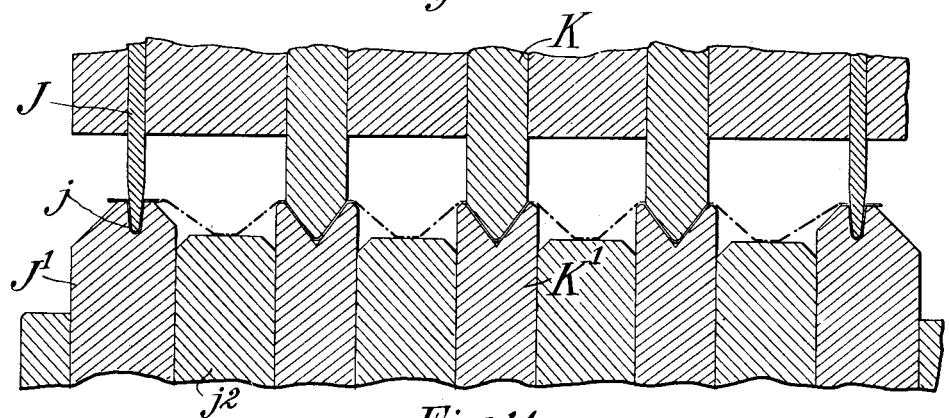
Figure 14:
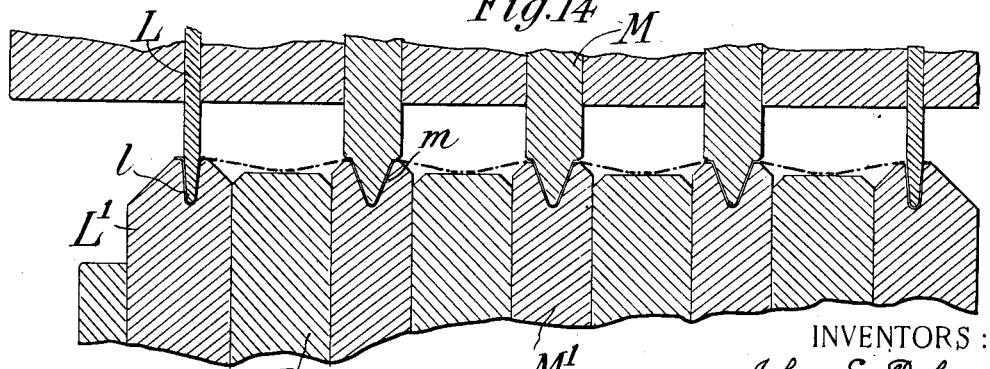
Figure 15:
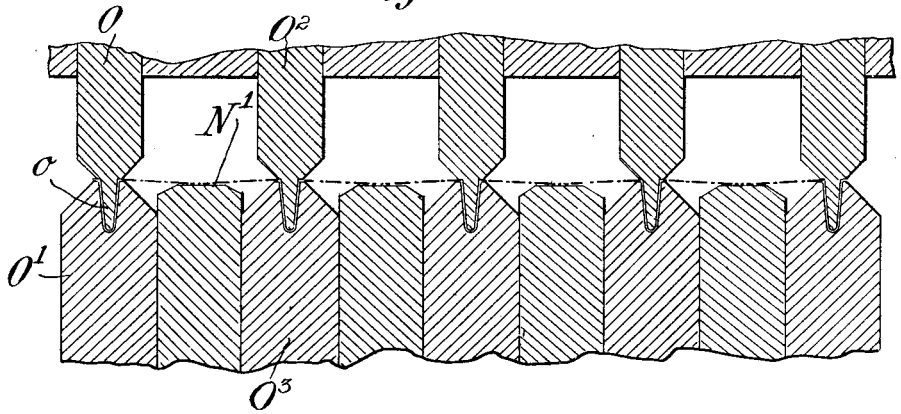

J. E. DOBSON & G. MERKEL.
PROCESS FOR PRODUCING EXPANDED METAL.
APPLICATION FILED JUNE 11, 1912.
1,119,932.
Patented Dec. 8, 1914.
7 SHEETS—SHEET 1.
Fig. 1.
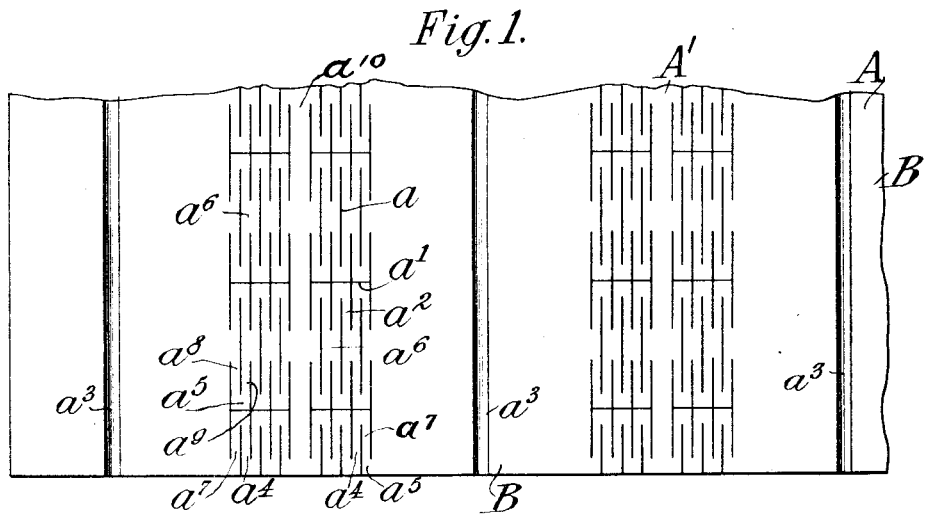
Fig. 2.
Fig. 4.
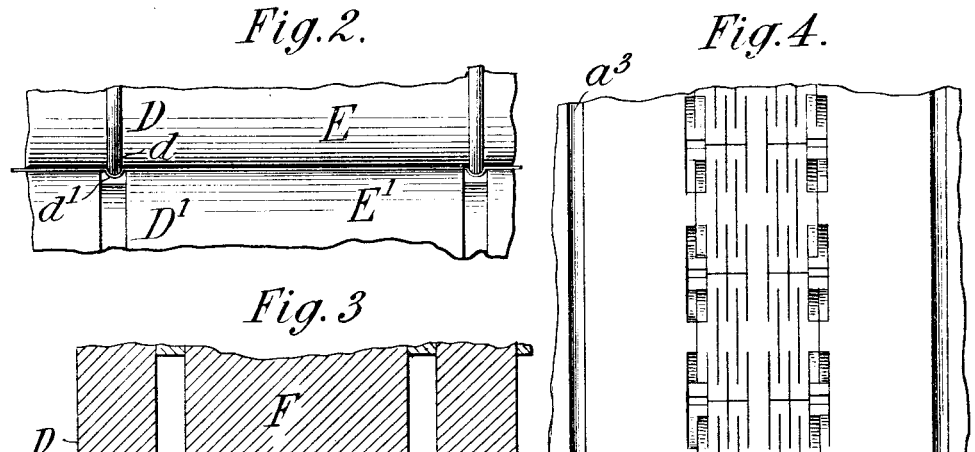
Fig. 3
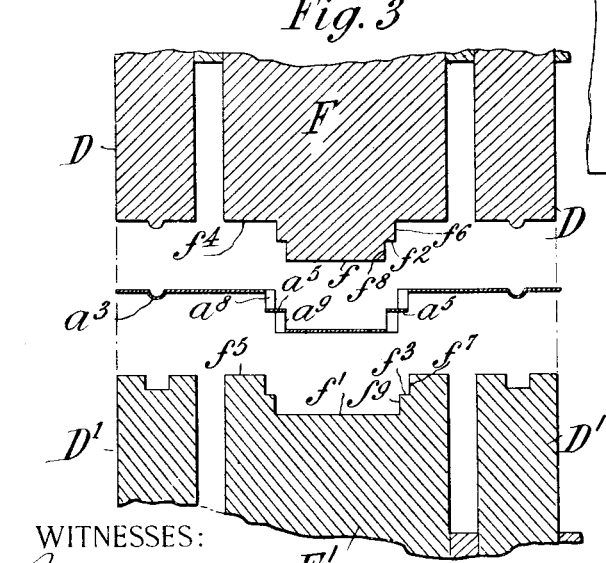
Fig. 5.
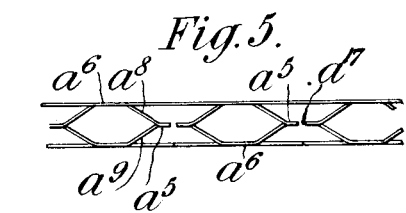
WITNESSES:
René Bruine
Fred White
INVENTORS:
John E. Dobson,
and Georg Merkel,
By Attorneys,
Fraser, Tucker & Myers J. E. DOBSON & G. MERKEL.
PROCESS FOR PRODUCING EXPANDED METAL.
APPLICATION FILED JUNE 11, 1912.
1,119,932.
Patented Dec. 8, 1914.
7 SHEETS—SHEET 2.
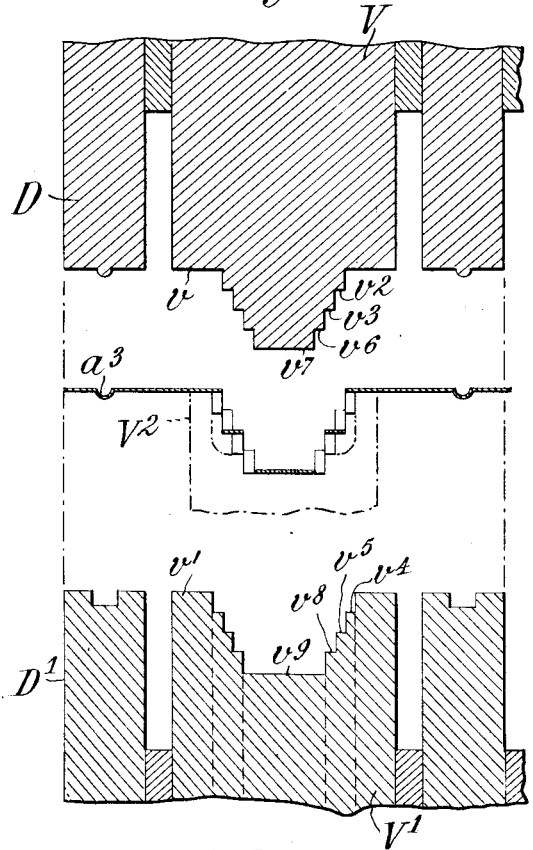
Fig. 6.
Fig. 8.
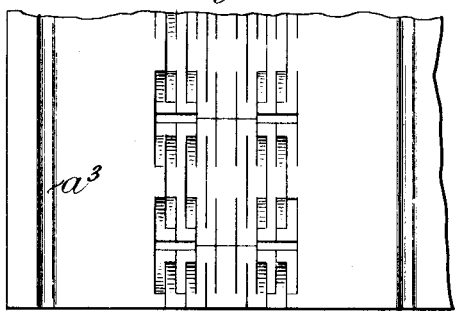
Fig. 7.
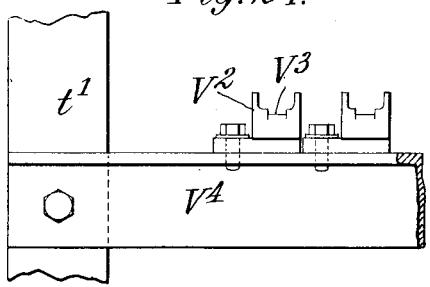
Fig. 24.
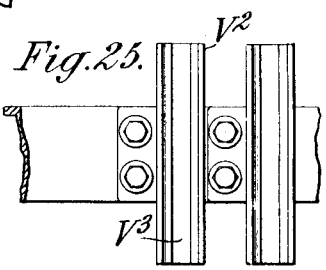
Fig. 25.
WITNESSES:
René Bruine
Fred White
INVENTORS:
John E. Dobson,
and Georg Merkel,
By Attorneys,
Fraser, Funk & Myers J. E. DOBSON & G. MERKEL.
PROCESS FOR PRODUCING EXPANDED METAL.
APPLICATION FILED JUNE 11, 1912.
1,119,932.
Patented Dec. 8, 1914.
7 SHEETS—SHEET 3.
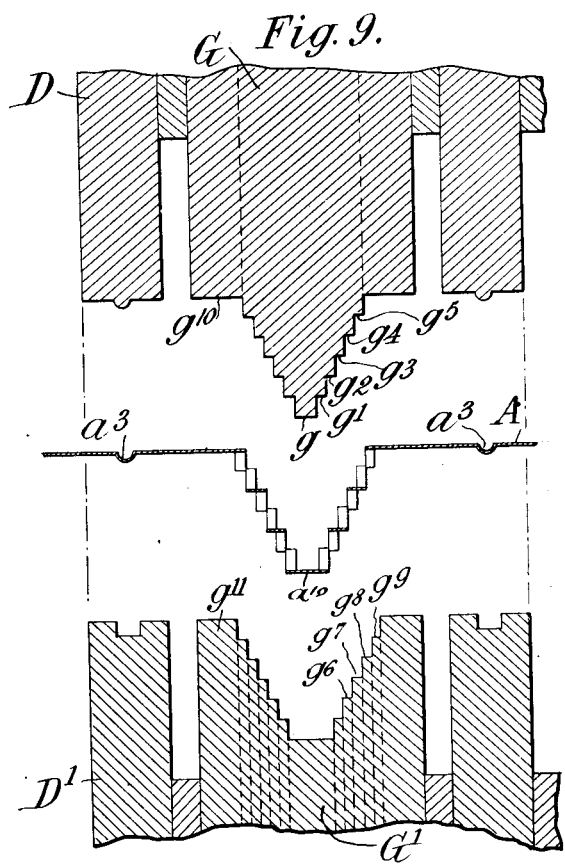
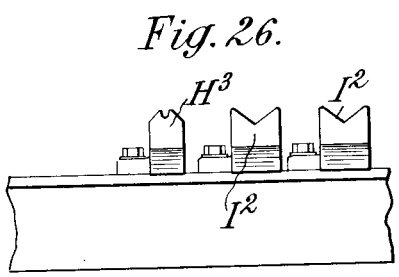
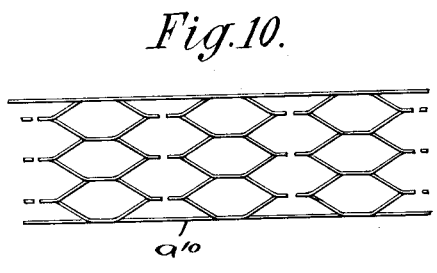
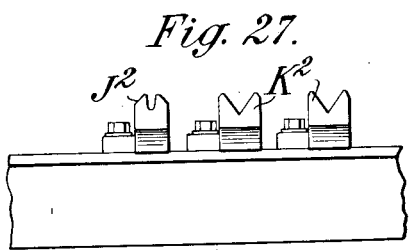
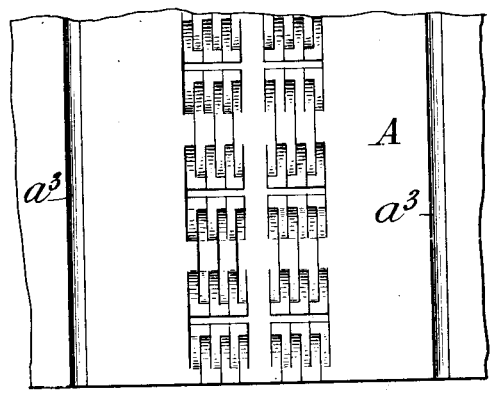
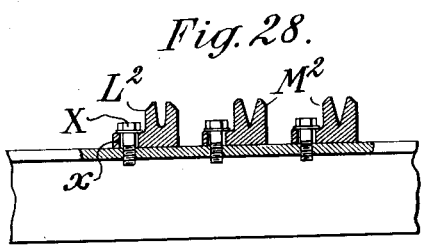
WITNESSES:
René Bruine
Fred White
INVENTORS:
John E. Dobson,
and Georg Merkel,
By Attorneys.
Fraser & Myers J. E. DOBSON & G. MERKEL.
PROCESS FOR PRODUCING EXPANDED METAL.
APPLICATION FILED JUNE 11, 1912.

1,119,932.

Patented Dec. 8, 1914.
7 SHEETS—SHEET 5.

WITNESSES:

INVENTORS:
John E. Dobson,
Georg Merkel,
By Attorneys,

J. E. DOBSON & G. MERKEL.
PROCESS FOR PRODUCING EXPANDED METAL.
APPLICATION FILED JUNE 11, 1912.

1,119,932.

Patented Dec. 8, 1914.
7 SHEETS—SHEET 6.

WITNESSES:

INVENTORS:
John E. Dobson
and Georg Merkel,
By Attorneys,

J. E. DOBSON & G. MERKEL.
PROCESS FOR PRODUCING EXPANDED METAL.
APPLICATION FILED JUNE 11, 1912.
1,119,932.
Patented Dec. 8, 1914.
7 SHEETS—SHEET 7.
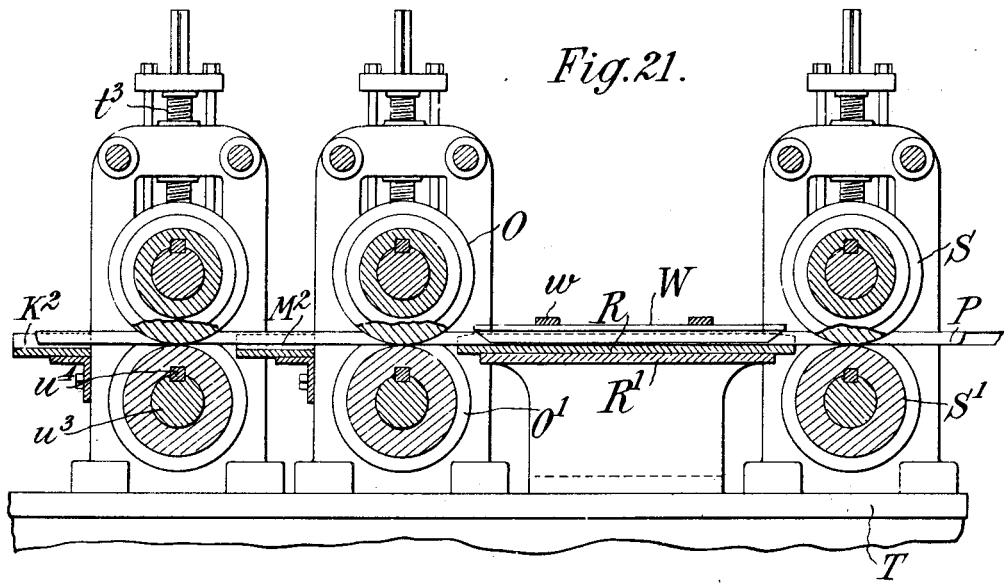
Fig. 21.
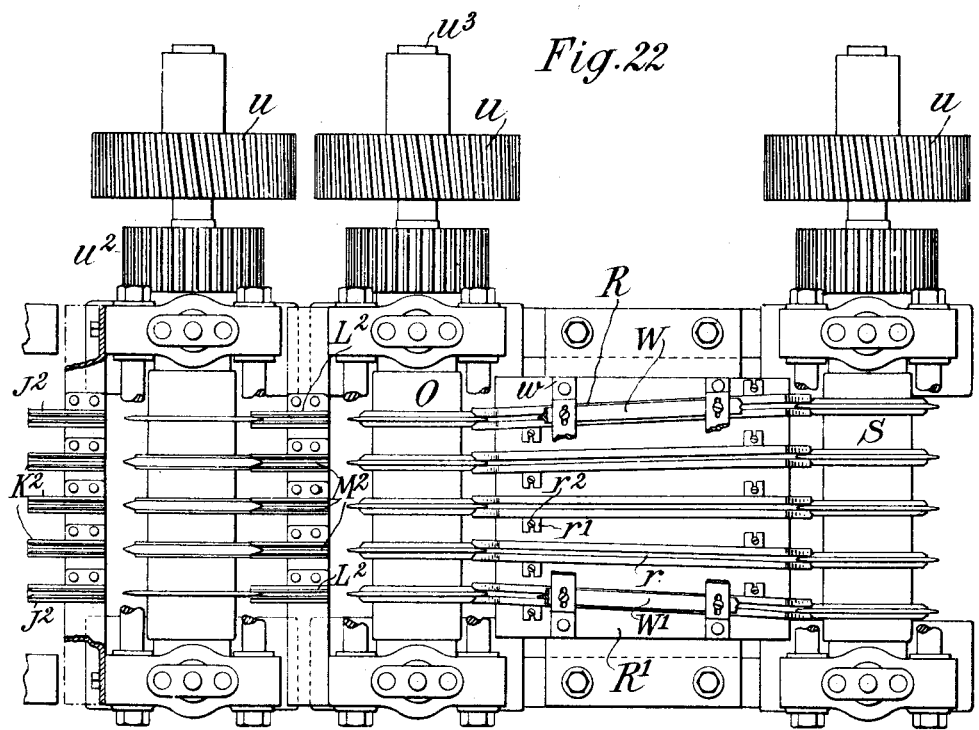
Fig. 22.
Fig. 23.
WITNESSES:
Rene' Prune
Fred White
INVENTORS:
John E. Dobson,
and Georg Merkel,
By Attorneys,
Fraser, Furth & Myers

UNITED STATES PATENT OFFICE.

JOHN E. DOBSON, OF NEW YORK, N. Y., AND GEORG MERKEL, OF WEST HOBOKEN, NEW JERSEY, ASSIGNORS TO E. W. BLISS COMPANY, OF BROOKLYN, NEW YORK, A CORPORATION OF WEST VIRGINIA.

PROCESS FOR PRODUCING EXPANDED METAL.

1,119,932.  Specification of Letters Patent.  Patented Dec. 8, 1914.

Application filed June 11, 1912. Serial No. 702,991.

*To all whom it may concern:*

Be it known that we, JOHN E. DOBSON, residing in the borough of Manhattan, city, county, and State of New York, and GEORG MERKEL, residing at West Hoboken, in the county of Hudson and State of New Jersey, both citizens of the United States, have jointly invented certain new and useful Improvements in Processes for Producing Expanded Metal, of which the following is a specification.

Our invention relates to a process for the production of expanded sheet metal, and is particularly useful in the production of a fabric having expanded portions which are separated by integral unexpanded or plain portions. Such partially expanded sheet may be employed for a variety of purposes, such, for instance, as the production of studdings, partitions, etc., having, if desired, raised ribs formed therein.

Although the production of expanded sheet metal has been well developed, it has so far as we are aware, heretofore not been possible to produce a sheet wherein a portion only thereof was expanded and the remainder was unexpanded, and the expanded part was of regular and uniform outline. The difficulty in the production of the article described consists in the difficulty of expanding the slitted sheet metal evenly, of preventing an undesired flow of the said metal, and in preventing a distortion thereof during the process of forming the expanded part so that symmetrical and even figures are produced in the expanded part, and in expanding an interior portion of an integral sheet without affecting the adjoining unexpanded parts.

Our process may be performed by hand if desired, or it may be performed on a large variety of machines. We prefer to employ machinery in the performance of said process, and in the accompanying drawings, we have illustrated machinery invented by us by the use of which the same may be performed. The said machine is not claimed in this application but is claimed in a separate application filed December 6, 1912, Serial No. 735,239.

Figure 16:
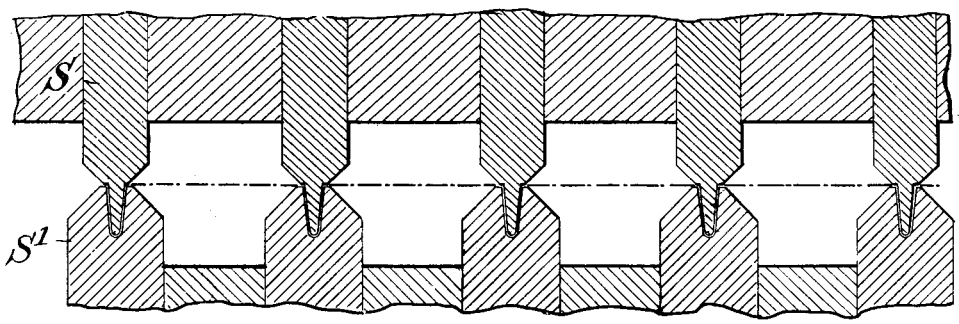
Figure 18:
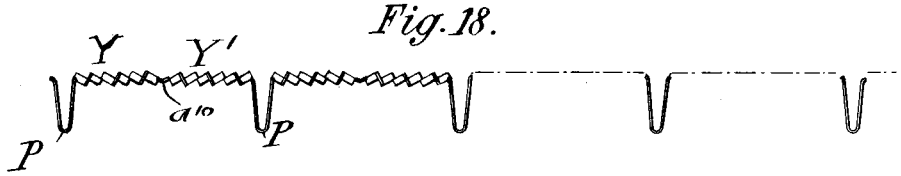
Figure 17:
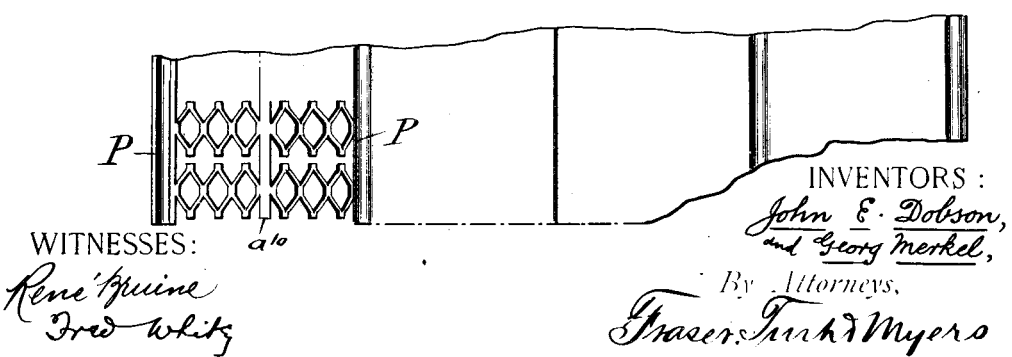
Figure 19:
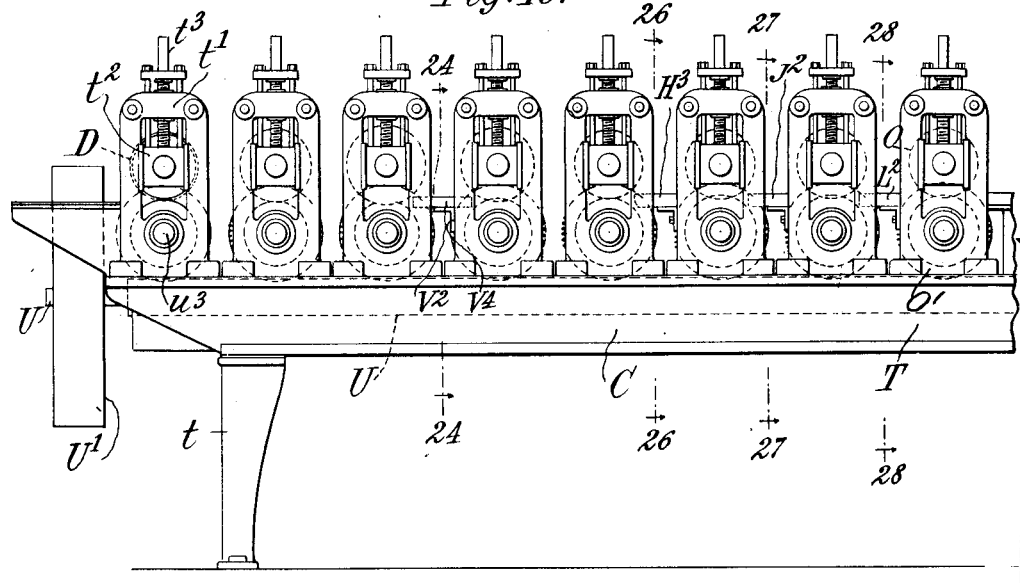
Figure 20:
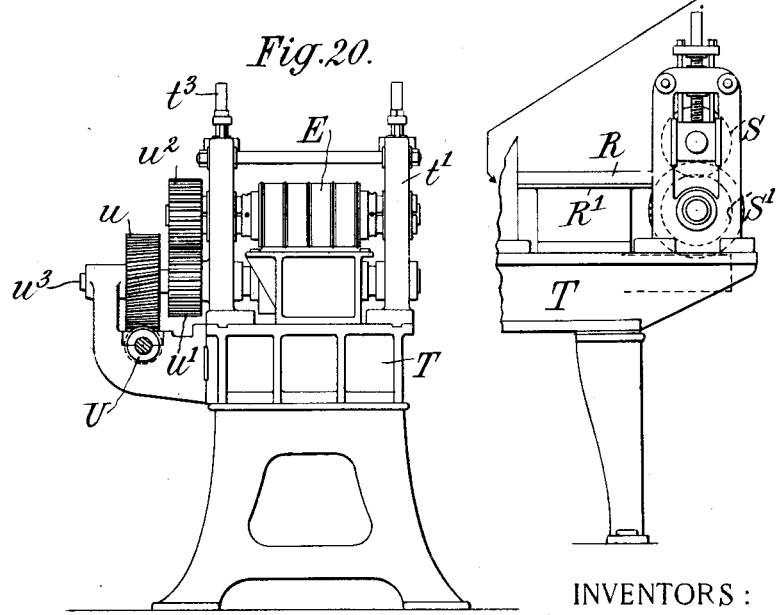

In the accompanying drawings, Figure 1 illustrates in plan view a piece of sheet metal slitted in places where it is to be expanded and ready for expanding; Fig. 2 illustrates in detail view feeding and guiding rolls which may be employed in said machine; Fig. 3 illustrates the first step in expanding the metal according to our invention, and shows in section rolls which may be employed to perform such operation, and a portion of the fabric in cross-section; Fig. 4 illustrates in plan view the sheet metal after treatment by the rolls of Fig. 3, and Fig. 5 is a side view thereof; Fig. 6 is a view similar to Fig. 3 illustrating the succeeding step in expanding the metal according to our invention, and shows in cross-section rolls which may be employed for such operation, and a portion of the fabric in cross-section, and Fig. 7 is a side view of the sheet metal after treatment by said rolls. Fig. 8 is a plan view of said sheet metal. Fig. 9 is a view similar to Fig. 3 illustrating in cross-section the final step in expanding the metal according to our invention, and shows in cross-section a pair of rolls which may be employed for such operation and a portion of the fabric in cross-section. Figs. 10 and 11 are respectively a side elevation and a plan view of the fabric illustrated in Fig. 9. Figs. 12–15 are views similar to Figs. 3 and 6 illustrating in cross-section rolls which may be employed should it be desired to form longitudinal ribs in said fabric, and to force the previously fully expanded slitted parts of the sheet from the several planes into which they had been forced by expanding the same into one general and substantially the same plane. Fig. 16 are feed rolls which may be employed to feed the completed fabric out of the machine. Fig. 17 illustrates in plan view a fabric constructed according to our invention and having longitudinal ribs therein, and Fig. 18 is an end elevation thereof; Fig. 19 is a side elevation of a machine which may well be employed in manufacturing our product, and Fig. 20 is an end elevation thereof from the left hand end of Fig. 19; Fig. 21 is a detailed longitudinal section of the right hand end of the machine; Fig. 22 is a plan view of the said parts; Fig. 23 is a detail view of one of the guides in cross-section. Figs. 24 and 25 are detail end and plan views respectively of center guides for guiding the partially expanded fabric from the rolls of Fig. 6 to those of Fig. 9. Fig. 26 is a detail end view of end and center guides for guiding the expanded fabric from the rolls of Fig. 12 to those of Fig. 13. Fig. 27 is a view similar to Fig. 26, of end and center guides for guiding the expanded fabric from the rolls of Fig. 13 to those of Fig. 14. Fig. 28 is a cross-section on the line 28—28, Fig. 19, of end and center guides for guiding the expanded fabric from the rolls of Fig. 14 to those of Fig. 15.

In accordance with our invention the metal fabric is preferably first sheared to desired size, and beads are formed therein at determined points and the sheets are then slitted. These operations may be done by hand or machines may be used. We have not thought it necessary to illustrate said machines, as they are of standard construction and may be used for the preliminary beading, shearing and slitting of sheets to be expanded and ribbed by the machine herein described. This slitting is preferably formed by cuts in the metal, some of which are longitudinal and some of which are transverse cuts, whereby when the metal is separated it will be found that the figures are divided one from another longitudinally, so that an expansion of the said figures will cause them to pull away from one another. The slitted portions are arranged in panels or vanes, and the metal between is unslitted, and is the part in which the ribs may be formed if desired. In expanding said slitted metal according to our invention the metal, while firmly held, is expanded at the slitted parts by a succession of bending operations, by which a part only of the slitted metal is bent or expanded at a time. Preferably this successive expanding operation is, broadly, as follows: We first hold the metal adjacent the slitted part firmly and then expand the adjacent slitted metal for one or two rows on each side by bending said rows so that the slitted parts are expanded. We then firmly hold the metal as before and by another operation expand another portion of the slitted metal for one or two rows on both sides by bending down the said rows adjacent the previously expanded part. Thereafter the fabric is again firmly held while the intermediate slitted portion is expanded by being bent. Thereby a longitudinal trough-like structure will be produced formed of the expanded parts of the metal with intervening plain portions, and it will be found that the unslitted parts will not have flowed but will have, as desired, sharp edges. This expanded metal fabric has its expanded portions of substantially V-shape in cross-section connected by flat portions.

The expanded metal fabric produced by the foregoing successive bending operations is then preferably treated so that the fully expanded slitted parts of the sheet are forced from the several planes into which they had been forced by expanding the same into one general and substantially the same plane. For this purpose a series of pressing dies in the form of rollers, of progressively increasing size, is employed whereby the said expanded portion is gradually forced into the desired plane. During this process a series of dies, preferably likewise in the form of rollers, of progressively increasing size, acting upon the unslitted portion of the sheet, change the unslitted portion of the sheet from a flat sheet in one plane to a U-shaped rib by the action of the forming dies, said rib extending longitudinally of the unslitted portion. During the formation of said longitudinal ribs, the edges of the unslitted portion of the sheet approach one another and provide the space which is required to accommodate the slitted portion of the sheet when expanded and when accupying one plane instead of the several planes into which it has been forced during the process of expansion. The slitted and expanded portions of the sheets are forced into one plane solely by the action of the dies which press the same into said plane. This operation is accomplished without further expansion of said slitted portions than has already taken place therein by the forcing of said slitted portion of the sheet into several planes as aforesaid. If desired the ribs may be further separated, causing a widening of the expanded metal fabric. The fabric illustrated has five longitudinal ribs and four slitted and expanded portions.

In Fig. 1 the slitted metal for producing the particular configuration of fabric shown in the drawings is illustrated. The strip A has plain or unslitted portions B and slitted portions $A^1$. The expanded part of the fabric when completed has a series of diamond shaped figures, connected at their sides and separated at their ends. This is formed, as follows: The slits are preferably formed as illustrated by longitudinal cuts $a$, which are staggered relatively to one another, and which form the sides of the frames of the diamonds. A short unslitted space $a^6$ is left between alined cuts $a$. Transverse cuts $a^1$ separate the ends of the diamonds. A strengthening longitudinal rib $a^{10}$, which is left unslitted, is substantially in the center of the slitted panel $A^1$ and is connected to the slitted figures by connecting portions $a^6$. It will be observed that the slits $a\ a^1$ produce figures such, for instance, as the one lettered $a^2$, which is connected at its sides to the adjoining figures by connecting portions $a^6$, but disconnected at its ends and all other parts. The particular outline of the figures is not material nor the manner of forming the slits. The fabric A comprises a series of broad unslitted parts or bands B in which the ribs P are formed, and also a series of intermediate or narrow, unslitted bands $a^{10}$, Each of the narrow, unslitted bands $a^{10}$ is displaced from the initial plane of the sheet during the process of expansion. On each side of these narrow, unslitted bands $a^{10}$ are slitted bands, each of which comprises seven rows of longitudinal slits $a$. These slits $a$ are arranged so that adjacent rows of slits break joints. Transverse slits $a'$ extend from side to side of each slitted band and are located so as to slit the fabric at substantially the middle of the outer row of slits, furnishing a means whereby, when the unslitted bands $a^{10}$ are displaced the fabric is opened out. The said strip is preferably treated in accordance with our invention in a machine as illustrated in Fig. 19, which as a whole is lettered C, and whereof a detailed description will be hereinafter contained. The said machine it will be observed, has nine series of rollers to the action of which the fabric is subjected in the machine. Of these the first are feed rolls, and the second to the eighth, inclusive, are operating rolls. The first series of rollers are rotary male and female gage rollers $D\ D^1$, as illustrated in Fig. 2, which are formed with male and female guides $d\ d'$. These guides enter the guiding ribs $a^3$ in the fabric A, and hold the sheet in place. Upon the same shafts with the rolls $D\ D^1$ are body rolls $E\ E'$ which serve to feed the fabric to the subsequent rolls and to straighten the same. From here the metal fabric A is fed to the second series of rolls which perform the first step in expanding the slitted metal according to our method. This operation is illustrated in Fig. 3, and employs gage rolls $D\ D^1$, and also male and female die rolls $F\ F^1$. The said die rolls $F\ F^1$ are provided upon their faces with male and female die faces $f$, $f^1$, $f^2$, $f^3$. The die rollers $F\ F^1$ are adjusted to grip the unslitted portion B of the fabric between faces $f^4\ f^5$ adjacent the slits and hold it against lateral movement. The male die faces $f^2$ are adapted to engage the rows $a^4$ (Fig. 1) and to depress the same, thereby expanding the outer row of diamond shaped figures. Rows $a^7$ will then lie in the space between the vertical die faces $f^6\ f^7$. Pressure of die $f^2$ upon the part of end portions $a^5$ which it engages will press the same down and cause the part of said portion $a^5$ which is engaged by the die $f^2$ to be forced down upon female die face $f^2$. This will cause the side frame $a^8$ which connects ends $a^5$ and side portions $a^6$ to be inclined relatively to said parts as indicated in Fig. 5. Male die face $f$ will likewise engage such part of the slitted portions of the fabric as is between the rows $a^4$, and will force the same down to female die face $f^1$, and the side frames $a^9$ which lie in row $a^4$ and connect ends $a^5$ to sides $a^6$, will lie between the vertical die faces $f^8\ f^9$ and will be inclined relatively thereto.

The action of the dies $F\ F^1$ as above explained will expand the outer row of diamond-shaped figures at each edge of the slitted part, as indicated in Fig. 5, and this result is accomplished without any distortion due to a tendency to reduce the dimensions of the strip A as the metal is expanded. This tendency is prevented by the cut $a^1$ which permits the drawing apart of adjacent portions $a^5$ where they are cut apart by the said cut $a^1$ leaving a space $a^{17}$ (Fig. 5). The next step in the method is illustrated as performed upon the fabric likewise by a series of male and female die rolls $V\ V^1$ (Fig. 6), which expand the next inner row of diamond-shaped figures on each side adjacent those first expanded. During this step the fabric is held against lateral movement by faces $v\ v^1$ which engage the unslitted part B and likewise by steps $v^2\ v^3\ v^4\ v^5$ on the male and female dies respectively which engage the expanded row. Male die V has faces $v^6\ v^7$ which engage the portions $a^5\ a^6$ of the next inner diamond-shaped row of figures on each side and depress the same against corresponding female die faces $v^8\ v^9$, thereby still further expanding the fabric so that two rows of diamond-shaped figures appear on each side (Fig. 7). Male and female gage rolls $D\ D^1$ by coöperating with bead $a^3$ hold the fabric against lateral movement and keep it in alinement. On its passage from rolls V, $V^1$ which perform the second expanding operation to the succeeding rolls, the fabric is preferably guided by center guides which are shown in reduced size in Figs. 24 and 25, and consist of longitudinal guides $V^2$ which have guiding channels $V^3$ that conform substantially to the shape of female die $V^1$ and are adapted to receive the expanded metal fabric after it leaves the dies V, $V^1$, and guide the same to the succeeding rolls. The guides $V^3$ are adjustably mounted upon angle irons $V^4$ which are supported on the machine frame. The fabric next passes between the rolls $G\ G^1$ (Fig. 9) for the final expanding step, and here also they will be held by gage rolls $D\ D^1$. The male and female die rolls $G\ G^1$ have die faces $g^2\ g^3\ g^4\ g^5\ g^6\ g^7\ g^8\ g^9$ which engage the strip at places corresponding to $v^2\ v^3\ v^4\ v^5\ v^6\ v^7\ v^8\ v^9$ and assist in holding the fabric which is also held firmly by faces $g^{10}\ g^{11}$ on the male and female die rolls. While the fabric is so held the male die faces $g$, $g^1$ with which the die G is equipped, by coöperation with corresponding female die faces, expand the remainder of the slitted part of the metal fabric in a manner corresponding to the action of dies $F\ F^1$ by bending the same down, as appears from side view Fig. 10, and from cross-section Fig. 9. Here it will be seen that the slitted part of the metal has been expanded until it assumes in cross-section a substantially trough-shaped form having substantially the outline of a V, wherein the side connecting portions $a^6$, as well as the end portions $a^5$ are in planes substantially parallel with the unslitted portion of the fabric. The operation of expanding the slitted portions is then complete and the fabric is ready for use in such condition if desired, or may have the expanded portion pressed up to the plane of the unslitted portion. For the purpose of forcing the previously fully expanded slitted parts of the sheet from the several planes into which they have been forced by expanding the same, to one general and substantially the same plane, a series of pressing dies are employed which successively press the said slitted and expanded metal into the plane of the unslitted portion, and the space required for the expanded metal so forced into said plane is produced by forming the unslitted metal into longitudinal ribs.

After leaving the final expanding dies illustrated in Fig. 9, the fabric is in cross-section, as illustrated in said Fig. 9 and side view as illustrated in Fig. 10. This fabric is then passed to the rolls illustrated in Fig. 12, where a series of pressing rolls $H^2$ engage the apex of the V-shaped expanded metal, and force the same toward the plane of the unexpanded portion. During this operation the metal which would otherwise produce a bulge in the fabric is taken care of by dies H $H^1$. The die H has a die face $h$ which enters the bead $a^3$ in the fabric and forces the same into a correspondingly-shaped female die face in the die $H^1$. The said dies are deeper than the dies $d$ $d^1$, and accordingly deepen the rib. At the same time dies I $I^1$ engage the intermediate unslitted portions of the fabric between the expanded portions, and form shallow grooves $i$ therein, as seen in Fig. 12. After leaving the rolls of Fig. 12 the metal fabric is guided to the next succeeding rolls by outside guides $H^3$, (Fig. 26) which receive the rib $h$ in the fabric, and by center guides $I^2$ which receive the rib $i$ in the fabric, and serve to guide the same and center the same for the following rolls. From the rolls of Fig. 12 the fabric so guided passes to the rolls of Fig. 13, where presser rolls $j^2$ serve to further force the fabric toward the plane of the unslitted parts, and the surplus metal here is taken up as in Fig. 12 by rolls J $J^1$, which deepen the rib as seen at $j$, and by center rolls K $K^1$ which deepen the rib formed by rolls I $I^1$ in the intermediate unslitted portions of the fabric. From these rolls the fabric is guided to the next succeeding rolls by guides $J^2$ $K^2$ which are illustrated in Fig. 27, and which guide the fabric to the rolls of Fig. 14, where presser dies N still further press the slitted portion toward the plane of the unslitted portion, and where the space required for this purpose is produced by ribs L $L^1$, M $M^1$, which in such action serve still further to deepen the ribs $l$ and the center ribs $m$ of the fabric. In the rolls L $L^1$ the outside ribs $l$ are finished, whereas the ribs $m$ are at the proper depth but are wider than is desired. Guides $L^2$ $M^2$ (Fig. 28) then guide the fabric to the rolls illustrated in Fig. 15, where presser rolls $N^1$ press the expanded portion of the fabric to substantially the plane of the unslitted portion and in which are illustrated male and female rolls O $O^1$ which are the size of rolls L $L^1$ and enter the ribs $o$. Center rolls $O^2$ $O^3$ shape the center ribs to final form.

The guides $V^2$ illustrated in Figs. 24 and 25 are mounted upon angle irons $V^4$ which are supported upon the side of frames $t^1$. The guides $H^3$, $I^2$, $J^2$, $K^2$, $L^2$, $M^2$, are similarly supported and all of these guides are made adjustable by means of set screws X, which pass through slots $x$ in the extended bases of the said guides, and engage in the tops of the angle irons $V^4$. This adjustability is to permit the guides to receive various sizes of expanded metal. After the fabric has passed through the rolls of Fig. 15 it may, if desired, be widened. This is accomplished by passing the ribs P through guiding channels $r$ in guides R (Fig. 23). These guides R diverge toward the end of the machine, as seen in Fig. 22, and lie in the plane of movement of the fabric, and the ribs being held tightly in the said channels $r$ by reason of stationary presser bars W $W^1$ which are situated relatively to guiding channels $r$ and are located one in each of the outer guides R, where they are held by brackets $w$. By means of said guides the fabric is widened and the expanded part thereof is stretched. The guides R are mounted upon a support $R^1$ secured to bed T, and are adjustable thereon by slotted brackets $r^1$ through which pass screws $r^2$ tapped into a fixed part of the machine. The fabric then passes between the rolls S $S^1$ (Fig. 16), which are provided with dies upon their surfaces conforming to the ribs P. The fabric emerges from between these rolls in the shape in cross-section illustrated in Fig. 18, and having the outline of expanded figures indicated in Fig. 17.

The machine as illustrated in Figs. 19, 20 comprises a bed portion T conveniently supported upon legs $t$ and having frames $t^1$ within which are supported blocks $t^2$ in which the upper rolls are journaled and wherein they may be adjusted by threaded posts $t^3$. The lower roll is revolved from a longitudinal worm U, having a driving pulley $U^1$ which engages a worm gear $u$ upon the shaft $u^3$ of each lower roll, and gears $w^1$ $u^2$ connect the lower and upper rolls in each pair, so that all the rolls are revolved in unison. Keys $u^4$ connect the lower rolls to their shafts $u^3$ and corresponding keys connect the upper rolls in the same manner.

In Figs. 1 to 11 we have illustrated the parts full size, whereas in Figs. 12–18 they are about half this size, and Figs. 19 to 28 are not drawn to particular scale.

In the machine as constructed the slitted metal is expanded by a succession of progressive bending operations which are illustrated as engaging the outer rows of slitted metal on each side of the slitted part and progressing toward the center. This is due to the fact that in the particular machines used the burs upon the edges of the slits were best adapted to this treatment. It is not, however, essential to the successful expansion of the slitted part that the bending operations should begin upon the outer side of the slitted part. The expanded metal could as well be produced by bending operations which begin at the central part of the slitted part and progressively engage additional slitted parts toward the outer rows, which would be the last depressed. In case the method should be employed in this manner the parts of the sheet which are not being expanded should be firmly held.

The machine described is useful in the employment of our method, but it is not essential thereto. The finished, expanded metal fabric produced by the foregoing method and process is illustrated in end view in Fig. 18 and plan view in Fig. 17. It is composed, as there shown, of longitudinal ribs P, between which the metal is expanded. Each expanded part of the fabric is composed of two portions Y $Y^1$ and the plane of the frames composing the figures in each row of figures in the said portions Y $Y^1$, are at an angle to each other; for instance, the plane of the metal composing the frame of figures Y, Y, if extended, would meet the plane of the frame composing the figures $Y^1$, a distance above the bar $a^{10}$ which divides the rolls of figures from each other. Therefore, while we have described with great particularity the particular construction of dies employed therein and their number, we have done so in order that a clear comprehension of the process as employed in said machine might be obtained, and not because said precise shape, number or succession of dies was essential.

Changes may be made in the particular steps as above set forth, within the limits of the appended claims, without departing from our invention.

We claim as our invention:—

1. The process of expanding a sheet of metal, wherein a slitted portion is bounded on each side by an integral unslitted portion, which consists in holding said unslitted parts against sidewise movement, and opening out each slitted portion while so held by successive displacing operations, each such operation opening out a part of the unexpanded slitted portion.

2. The process of expanding a sheet of metal, wherein a slitted portion is bounded on each side by an integral unslitted portion, which consists in opening out each slitted portion by successive displacing operations, each such operation opening out a part of the unexpanded slitted portion, and in holding the sheet against lateral movement on each side of the portion being opened out, during such operation.

3. The process of expanding a sheet of metal, wherein a slitted portion is bounded on each side by an integral unslitted portion, which consists in holding said sheet against sidewise movement adjacent the part being expanded, and opening each slitted portion while so held by successive displacing operations, each such operation opening out a part of the unexpanded slitted portion next that already opened out.

4. The process of expanding a sheet of metal wherein a slitted portion is bounded on each side by an integral unslitted portion, which consists in holding said sheet against sidewise movement, and opening out each slitted portion while so held by successive displacing operations beginning at the outer edges of the slitted portion and progressing toward the center, each such operation opening out a part of the unexpanded slitted portion.

5. The process of expanding a sheet of metal wherein a slitted portion is bounded on each side by an integral unslitted portion, which consists in holding said sheet against sidewise movement, and opening out each slitted portion while so held by successive displacing operations, each such operation opening out a part of the unexpanded slitted portion, and the first displacing operation opening out the outer edges of the slitted portion; the next displacing operation opening out an additional part of the slitted portion on each side next that already opened out and the last displacing operation opening out the intermediate slitted part of the sheet.

6. The process of expanding a sheet of metal wherein a slitted portion is bounded on each side by an integral unslitted portion, which consists in holding said sheet against sidewise movement, and opening out each slitted portion while so held by successive displacing operations, each such operation opening out a part of the unexpanded slitted portion, the first operation opening out the outer row of figures formed by said slits on each side of the slitted parts and each subsequent displacing operation opening out a row of said figures next those already opened out.

7. The process of expanding a sheet of metal, wherein a slitted portion is bounded on each side by an integral unslitted portion, which consists in holding said sheet against sidewise movement and subjecting said sheet while so held to a series of rolling operations which successively displace and open out said slitted portion, each of said rolling operations opening out a part of the unexpanded slitted portion.

8. The process of expanding a sheet of metal wherein a slitted portion is bounded on each side by an integral unslitted portion, which consists in holding said unslitted parts against transverse movement and expanding each slitted portion while so held by successive bending operations, each such operation expanding a part of the unexpanded slitted portion.

9. The process of expanding a sheet of metal wherein a slitted portion has longitudinal and transverse cuts therein and is bounded on each side by an integral unslitted portion, which consists in holding said unslitted parts against sidewise movement and opening out each slitted portion while so held by successive displacing operations, each such operation opening out a part of the unexpanded slitted portion.

10. The process of expanding a sheet of metal wherein a slitted portion has longitudinal and transverse cuts therein and is bounded on each side by an integral unslitted portion which consists in holding the unslitted parts against sidewise movement and opening out the slitted parts on each side next the unslitted parts by displacing the intermediate slitted parts and in then opening out the remainder of the slitted portion in the same way while the sheet is similarly held, so that the slitted part when fully opened out has a trough shape.

11. The process of expanding a sheet of metal having unslitted portions bounding each side of a slitted portion, said slitted portion having longitudinal slits and transverse slits, whereby rows of symmetrical figures are produced connected at their sides and disconnected at their ends, which consists in passing said slitted metal between dies wherein a portion only of said slitted part is expanded by pressure applied thereto and in holding said unslitted parts against lateral movement during such process, and in then successively expanding additional rows of figures adjacent to those already expanded while the said unslitted parts are similarly held until the entire slitted part of said fabric is expanded.

12. The process of expanding a sheet of metal wherein a slitted portion has a succession of longitudinal cuts therein staggered with relation to each other and transverse cuts at intervals, and is bounded on each side by an integral unslitted portion which consists in holding said sheet against sidewise movement and opening out each slitted portion while so held by successive displacing operations beginning at the outer rows on each side of the slitted portion and progressing inwardly, each such operation opening out a part of the unexpanded slitted portion.

13. The process of expanding a sheet of metal having unslitted portions bounding each side of a slitted portion, said slitted portion having a succession of longitudinal cuts therein, staggered with relation to each other, and transverse cuts at intervals, which consists in holding against transverse movement on each side of a slitted part, while a row of slitted figures is expanded by being bent between rollers and expanding adjacent rows by succeeding rollers while the fabric is similarly held until the slitted portion of said fabric is fully expanded.

14. The process of expanding a sheet of metal wherein a slitted portion has longitudinal and transverse cuts therein and is bounded on each side by an integral unslitted portion, which consists in holding said unslitted parts against sidewise movement and opening out each slitted portion while so held by successive displacing operations, each such operation opening out a part of the unexpanded slitted portion, and in then pressing said expanded metal to the plane of the unslitted portion of the sheet.

15. The process of expanding a sheet of metal wherein a slitted portion has longitudinal slits and transverse connecting slits whereby rows of symmetrical figures are produced connected at their sides and disconnected at their ends, which slitted portion is bounded on each side by an integral unslitted portion, which process consists in expanding said slitted portion by successive pressing operations, the first pressing operation opening out a row of slitted figures and succeeding pressing operations opening out additional rows of slits adjacent those already opened out until the entire slitted portion is expanded, and in then pressing said expanded portion to a uniform plane.

16. The process of producing a sheet of metal wherein a slitted portion is bounded on each side by an integral unslitted portion, which consists in holding the sheet against sidewise movement and opening out each slitted portion while so held by successive bending operations, each such bending operation opening out a part of the unexpanded slitted portion, whereby said slitted portion is expanded out of the plane of said unslitted portion, and in then pressing said expanded portion to a uniform plane.

17. The process of producing a sheet of metal wherein a slitted portion is bounded on each side by an integral unslitted portion, which consists in holding the sheet against sidewise movement and opening out each slitted portion while so held by successive bending operations, each such bending operation opening out a part of the unexpanded slitted portion, whereby said slitted portion is expanded out of the plane of said unslitted portion, and in then pressing said slitted portion to the plane of said unslitted portion by a succession of progressively increasing pressing operations.

18. The process of producing a sheet of metal expanded at intervals which consists in slitting the metal, in expanding the slitted part by successive bendings each bending engaging an unexpanded slitted portion, whereby said slitted portion is expanded out of the plane of said unslitted portion, and in then pressing said slitted portion to the plane of said unslitted portion by a succession of progressively increasing pressing operations, and simultaneously forming longitudinal ribs in said unslitted portion by a succession of progressively deepening bending operations.

19. The process of expanding a sheet of metal wherein a slitted portion is bounded on each side by an integral unslitted portion, which consists in holding said sheet against sidewise movement and opening out each slitted portion while so held by successive displacing operations, each such operation opening out a part of the unexpanded slitted portion and the first displacing operation opening out part of the slitted portion at each side next the unslitted portion, and successive operations opening out the intermediate slitted portions adjacent those already opened out and in then pressing said slitted portion to the plane of the unslitted portion.

20. The process of expanding a sheet of metal wherein a slitted portion is bounded on each side by an integral unslitted portion, which consists in holding said sheet against sidewise movement and opening out each slitted portion while so held by successive displacing operations, each such operation opening out a part of the unexpanded slitted portion and the first displacing operation opening out part of the slitted portion at each side next the unslitted portion, and successive operations opening out the intermediate slitted portions adjacent those already opened out and in then pressing said slitted portion to the plane of the unslitted portion by a succession of progressively increasing pressing operations.

21. The process of producing sheet metal expanded at intervals, comprising expanding the slitted metal while holding the sheet by a succession of progressive bending operations, whereby said slitted portion is expanded out of the plane of said unslitted portion, and in then pressing said slitted portion to the plane of said unslitted portion by a succession of progressively increasing pressing operations, and simultaneously forming longitudinal ribs in said unslitted portion by a succession of progressively deepening bending operations.

22. The process of expanding a sheet of metal at intervals which consists in slitting portions of the metal, in holding the sheet and expanding the slitted portions by a succession of bending operations, progressively engaging and bending additional slitted portions, whereby said slitted portion is expanded out of the plane of said unslitted portion, and in then pressing said slitted portion to the plane of said unslitted portion, by a succession of progressively increasing pressing operations, and simultaneously forming longitudinal ribs in said unslitted portion by a succession of progressively deepening bending operations.

23. The process of expanding a sheet of metal wherein a slitted portion is bounded on each side by an integral unslitted portion, which consists in holding said sheet against sidewise movement, and opening out each slitted portion while so held by successive displacing operations, each such operation opening out a part of the unexpanded slitted portion, the first operation opening out the outer row of figures formed by said slits on each side of the slitted parts, and each subsequent displacing operation opening out a row of said figures next those already opened out, and in then pressing said slitted portion to the plane of said unslitted portion.

24. The process of expanding a sheet of metal wherein a slitted portion is bounded on each side by an integral unslitted portion, which consists in holding said sheet against sidewise movement, and opening out each slitted portion while so held by successive displacing operations, each such operation opening out a part of the unexpanded slitted portion, the first operation opening out the outer row of figures formed by said slits on each side of the slitted parts, and each subsequent displacing operation opening out a row of said figures next those already opened out, and in then pressing said slitted portion to the plane of said unslitted portion, by a succession of progressively increasing pressing operations.

25. The process of expanding a sheet of metal at intervals which consists in slitting said sheet and in expanding a row of said slitted part by a bending operation while the sheet is held, and in subsequently expanding an additional row on each side by later bending operations, while said sheet is similarly held, whereby said slitted portion is expanded out of the plane of said unslitted portion, and in then pressing said slitted portion to the plane of said unslitted portion, by a succession of progressively increasing pressing operations, and simultaneously forming longitudinal ribs in said unslitted portion by a succession of progressively deepening bending operations.

26. The process of producing expanded sheet metal, which consists in slitting the metal at intervals, in then holding the unslitted parts against transverse movement, and expanding the slitted parts by pressing them out of their normal plane by a series of bending operations, successively engaging additional slitted and unexpanded metal, whereby said slitted portion is expanded out of the plane of said unslitted portion, and in then pressing said slitted portion to the plane of said unslitted portion by a succession of progressively increasing pressing operations, and simultaneously forming longitudinal ribs in said unslitted portion by a succession of progressively deepening bending operations.

27. The process of expanding sheet metal which consists in forming a series of slits therein at intervals, in then holding the unslitted part thereof and depressing the slitted part by a succession of progressive bending operations which successively expand additional slitted portions, whereby said slitted portion is expanded out of the plane of said unslitted portion, and in then pressing said slitted portion to the plane of said unslitted portion by a succession of progressively increasing pressing operations, and simultaneously forming longitudinal ribs in said unslitted portion by a succession of progressively deepening bending operations.

28. The process of producing ribbed expanded sheet metal, which consists in slitting the metal at intervals by forming a succession of longitudinal cuts therein, staggered with relation to each other, and transverse cuts at intervals, in then holding the fabric against transverse movement on each side of a slitted part, while a row of slitted figures is expanded by being bent between rollers and expanding adjacent rows by succeeding rollers while the fabric is similarly held until the slitted portion of said fabric is fully expanded, whereby said slitted portion is expanded out of the plane of said unslitted portion, and in then pressing said slitted portion to the plane of said unslitted portion.

29. The process of producing ribbed expanded sheet metal, which consists in slitting the metal at intervals by forming a succession of longitudinal cuts therein, staggered with relation to each other, and transverse cuts at intervals, in then holding the fabrics against transverse movement on each side of a slitted part, while a row of slitted figures is expanded by being bent between rollers and expanding adjacent rows by succeeding rollers while the fabric is similarly held until the slitted portion of said fabric is fully expanded, whereby said slitted portion is expanded out of the plane of said unslitted portion, and in then pressing said slitted portion to the plane of said unslitted portion by a succession of progressively increasing pressing operations.

30. The process of producing ribbed expanded sheet metal, which consists in slitting the metal at intervals by forming a succession of longitudinal cuts therein, staggered with relation to each other, and transverse cuts at intervals, in then holding the fabric against transverse movement on each side of a slitted part, while a row of slitted figures is expanded by being bent between rollers and expanding adjacent rows by succeeding rollers while the fabric is similarly held until the slitted portion of said fabric is fully expanded, whereby said slitted portion is expanded out of the plane of said unslitted portion, and in then pressing said slitted portion to the plane of said unslitted portion by a succession of progressively increasing pressing operations, and simultaneously forming longitudinal ribs in said unslitted portion by a succession of progressively deepening bending operations.

31. The process of expanding a sheet of metal, which is slitted at intervals and which has intervening unslitted portions, which consists in bending a portion of the slitted part out of its normal plane and in then similarly treating the slitted portions next adjacent on each side to that already expanded and in repeating this operation until the expanding is completed.

32. The process of expanding a sheet of metal, which is slitted at intervals and which has intervening unslitted portions, which consists in bending a portion of the slitted part out of its normal plane and in then similarly treating the slitted portions next adjacent on each side to that already expanded and in repeating this operation until the expanding is completed, and in then pressing the said expanded portion to its normal plane by a succession of progressively increasing bending operations.

33. The process of expanding a sheet of metal, wherein a slitted portion is bounded on each side by integral unslitted portions, which consists in opening out each slitted portion by successive displacing operations, each such operation bending a portion of the unexpanded slitted part out of its normal plane and in then similarly treating the slitted portions next adjacent on each side to that already expanded and in repeating this operation until the expanding is completed, and in guiding the fabric between said successive bending operations whereby its register is assured.

34. The process of expanding a sheet of metal, wherein a slitted portion is bounded on each side by integral unslitted portions, which consists in opening out each slitted portion by successive displacing operations, each such operation bending a portion of the slitted part out of its normal plane and in then similarly treating the slitted portions next adjacent on each side to that already expanded and in repeating this operation until the expanding is completed, and in holding the said fabric against lateral movement during each of said bending operations.

35. The process of producing ribbed, expanded sheet metal, which consits in slitting the metal at intervals by forming a succession of longitudinal cuts therein, staggered with relation to each other, and transverse cuts at intervals, in then passing the said fabric between a series of successive dies wherein the fabric is held against transverse movement on each side of a slitted part, while a row of slitted figures is expanded by being bent between said dies, and said operations are repeated in succeeding dies, with adjacent rows until the slitted portion of said fabric is fully expanded.

36. The process of producing ribbed, expanded sheet metal, which consists in slitting the metal at intervals by forming a succession of longitudinal cuts therein, staggered with relation to each other, and transverse cuts at intervals, in then passing the said fabric between a series of successive dies wherein the fabric is held against transverse movement on each side of a slitted part, while a row of slitted figures is expanded by being bent between said dies, and said operations are repeated in succeeding dies, with adjacent rows until the slitted portion of said fabric is fully expanded, whereby said slitted portion is fully expanded out of the plane of said unslitted portion and in then pressing said slitted portion to the plane of said unslitted portion.

37. The process of manufacturing expanded metal which consists in slitting a metal sheet so as to form bands of unslitted metal alternating with bands of slitted metal, the slits being arranged in parallel rows wherein the slits of one row break joint with the slits of the next adjacent row, displacing alternate unslitted bands with relation to the general plane of the sheet and thereby opening out the slitted portions, and bending the metal at the margins of the displaced bands to bring the slitted portions into a common plane.

38. The process of manufacturing expanded metal which consists in slitting a metal sheet so as to form bands of unslitted metal alternating with bands of slitted metal, the slits being arranged in parallel rows wherein the slits of one row break joint with the slits of the next adjacent row, displacing alternate unslitted bands with relation to the general plane of the sheet and thereby opening out the slitted portions, bending the metal at the margins of the displaced bands to bring the slitted portions into a common plane, and simultaneously forming the other unslitted bands into ribs.

39. The process of manufacturing expanded metal which consists in slitting a metal sheet so as to form bands of unslitted metal alternating with bands of slitted metal, the bands of unslitted metal comprising wide bands and a narrower band between each two wide bands, the slits being arranged in parallel rows wherein the slits of one row break joint with the slits of the next adjacent row, displacing the narrow bands with relation to the initial plane of the sheet and thereby opening out the slitted portions, and bending the metal at the margins of the narrow displaced bands to bring the slitted portions into a common plane.

40. The process of manufacturing expanded metal which consists in slitting a metal sheet so as to form bands of unslitted metal alternating with bands of slitted metal, the slits being arranged in parallel rows whereby the slits of one row break joint with the slits of the next adjacent row, displacing alternate unslitted bands with respect to the general plane of the sheet and thereby opening out the slitted portions, this displacement being effected step by step, and the first step being the opening out of the strands of metal between the first, second and third rows of slits next to the respective unslitted portions remaining in said general plane.

41. The process of manufacturing expanded metal which consists in slitting a metal sheet so as to form bands of unslitted metal alternating with bands of slitted metal, each band of slitted metal comprising an uneven number of parallel rows of slits wherein the slits of one row break joint with the slits of the next adjacent row, some of the bands of unslitted metal being wide and the unslitted bands between such wide bands being narrow, and the slitted bands on each side of said narrow bands having the same number of rows of slits, displacing the narrow bands out of the plane of the sheet step by step by first opening out the strands of metal between the first, second and third rows of slits nearest the wide bands, then opening out the strands between the third, fourth and fifth rows of slits, then opening out the strands between the fifth, sixth and seventh rows of slits, and then bending the metal along the margins of said narrow bands to bring the slitted portions into a common plane.

42. The process of manufacturing expanded metal which consists in slitting a metal sheet so as to form bands of unslitted metal alternating with bands of slitted metal, each band of slitted metal comprising an uneven number of parallel rows of slits wherein the slits of one row break joint with the slits of the next adjacent row, some of the bands of unslitted metal being wide and the unslitted bands between such wide bands being narrow and the slitted bands on each side of said narrow bands having the same number of rows of slits, displacing the narrow bands out of the plane of the sheet step by step by first opening out the strands of metal between the first, second and third rows of slits nearest the wide bands, then opening out the strands between the third, fourth and fifth rows of slits, then opening out the strands between the fifth, sixth and seventh rows of slits, then bending the metal along the margins of said narrow bands to bring the slitted portions into a common plane, and forming the wide bands into ribs simultaneously with said last-mentioned bending.

43. The process of expanding a sheet of metal having integral slitted and unslitted portions, which consists in first slitting all said portions to be expanded, in their opening out each slitted portion by successive displacing operations, each such operation opening out a part of the unexpanded slitted portion, and in holding the sheet against lateral movement on each side of the portion being opened out during such operation.

44. The process of expanding a sheet of metal which consists in slitting the sheet into bands of parallel rows of slits extending legnthwise of said sheet, there being an uneven number of rows of slits in each band and the slits of each row of a band breaking joint with the slits of adjacent rows, and opening out each band by successive steps, each step consisting in opening out the strands between three adjacent rows of slits.

In witness whereof, we have hereunto signed our names in the presence of two subscribing witnesses.

JOHN E. DOBSON.
GEORG MERKEL.

Witnesses:
 CHAS. J. ELLSWORTH,
 EDW. C. REDHEAD.